United States Patent
Kim

(10) Patent No.: US 7,578,363 B2
(45) Date of Patent: Aug. 25, 2009

(54) POWER TRANSMISSION DEVICE FOR HYBRID VEHICLE

(75) Inventor: Kyung Ha Kim, Gyunggi-Do (KR)

(73) Assignee: Hyundai Motor Company, Seoul (KR)

( * ) Notice: Subject to any disclaimer, the term of this patent is extended or adjusted under 35 U.S.C. 154(b) by 47 days.

(21) Appl. No.: 12/006,185

(22) Filed: Dec. 31, 2007

(65) Prior Publication Data

US 2009/0062052 A1    Mar. 5, 2009

(30) Foreign Application Priority Data

Sep. 5, 2007    (KR)    ...................... 10-2007-0089881

(51) Int. Cl.
*B60K 1/00*    (2006.01)

(52) U.S. Cl. .................................... 180/65.25; 180/165
(58) Field of Classification Search ............. 180/65.21, 180/65.25, 65.245, 65.7, 165
See application file for complete search history.

(56) References Cited

U.S. PATENT DOCUMENTS

| | | | | |
|---|---|---|---|---|
| 4,346,773 | A * | 8/1982 | Hofbauer et al. | ............. 180/165 |
| 5,833,022 | A * | 11/1998 | Welke | ...................... 180/65.25 |
| 5,927,452 | A * | 7/1999 | Freise et al. | ............... 192/3.52 |
| 6,116,364 | A * | 9/2000 | Taguchi et al. | ........... 180/65.26 |
| 6,424,126 | B1 * | 7/2002 | Ohsawa | ......................... 322/4 |

(Continued)

FOREIGN PATENT DOCUMENTS

JP    2003-048438    2/2003

(Continued)

*Primary Examiner*—Christopher P Ellis
*Assistant Examiner*—Bridget Avery
(74) *Attorney, Agent, or Firm*—Edwards Angell Palmer & Dodge LLP; Peter F. Corless

(57) ABSTRACT

The present invention provides a layout of a power transmission device for a hybrid vehicle which provides a high damping force a high damping force against engine fluctuation at low RPM operation by an engine For this, the preset invention provides a power transmission device for a hybrid vehicle, in which an automatic transmission having an input shaft, a motor, an engine clutch, a flywheel, and an engine having an output shaft connected to a crank shaft of the engine are directly connected to the same axis, the power transmission device including: a motor support shaft, the outer end of which is supported by a motor rotor and the inner end of which extends toward the boundary between the output shaft of the engine and the input shaft of the automatic transmission; a motor housing arranged so as to surround the outer circumference and the left side surface of the motor rotor; a torsion damper disposed between the left side end of the motor housing and the motor rotor; an engine clutch, disposed between the left side end of the motor housing and the left side surface of the inner end of the motor support shaft, for power transmission between the output shaft of the engine and the input shaft of the automatic transmission; a retainer connecting a housing of the engine clutch to the torsion damper; a motor cover housing arranged to cover the right side surface of the motor rotor and the right side surface of the inner end of the motor support shaft and including a concave portion on the right side surface thereof; and a flywheel positioned at the concave portion of the motor cover housing to be blocked from the motor rotor.

5 Claims, 2 Drawing Sheets

U.S. PATENT DOCUMENTS

| | | | |
|---|---|---|---|
| 6,455,968 B2 * | 9/2002 | Honorio et al. | 310/102 R |
| 6,558,289 B2 | 5/2003 | Chung | |
| 6,655,484 B2 | 12/2003 | Levin | |
| 6,863,140 B2 | 3/2005 | Noreikat et al. | |

FOREIGN PATENT DOCUMENTS

| | | |
|---|---|---|
| JP | 2003-063261 | 3/2003 |
| JP | 2004-114713 | 4/2004 |
| JP | 2006-315662 | 11/2006 |

* cited by examiner

POWER TRANSMISSION DEVICE FOR HYBRID VEHICLE

CROSS-REFERENCE TO RELATED APPLICATION

This application claims under 35 U.S.C. §119(a) on Korean Patent Application No. 10-2007-0089881, filed on Sep. 5, 2007, the entire contents of which are incorporated herein by reference.

BACKGROUND (a) Technical Field

The present invention relates to a power transmission device for a hybrid vehicle. More particularly, the present invention relates to a power transmission device for a hybrid vehicle, which provides a high damping force against engine fluctuation at low RPM operation by an engine and has an effective layout in terms of driving performance at low RPM by the engine and in terms of NVH (noise, vibration and harshness).

(b) Background Art

In general, a power transmission device for a hybrid vehicle has a layout in which an automatic transmission, a motor, an engine and an integrated starter-generator (ISG) are arranged in a row.

In the hybrid vehicle using the engine and the motor, the motor which is efficient at a low RPM is used for initial acceleration. When the vehicle reaches a predetermined speed, a generator that has the function of a starter motor, i.e., the ISG, starts the engine, and the outputs of the engine and the motor are used simultaneously.

At this time, in order to integrally use the output of the engine and the output of the motor using energy generated by the ISG, the vehicle has a structure in which each of the outputs is connected to one unit of a planetary gear, not depicted, of the automatic transmission.

That is, the engine is connected to a carrier of the planetary gear, the ISG is connected to a sun gear of the planetary gear, and the motor is connected to a ring gear.

Accordingly, rotational power of the engine is adjusted to an appropriate speed in the planetary gear of the automatic transmission, then transferred to a drive shaft, and finally transferred to a drive wheel through a propeller shaft.

At the same time, the ISG connected to the sun gear of the planetary gear in the automatic transmission receives the rotational power from the engine and generates electricity during deceleration. The electricity generated by the ISG is charged to a charger through an inverter, not depicted, and then the inverter supplies electricity to the motor for rotating the drive shaft during vehicle startup or acceleration.

Since the power transmission device for a hybrid vehicle has a structure in which the automatic transmission, the motor, the torque converter, the engine and the ISG are arranged in a row, the overall length of the engine room is increased, and thus it is disadvantageous in terms of the layout and mounting of the respective components. Moreover, it is difficult to commonly apply such a power transmission device to a plurality of different platforms. Accordingly, extensive research aimed at developing a power transmission device which is advantageous for mass production and has an optimal layout has continued to progress.

For conventional power transmission devices for a hybrid vehicle, a primary inertia in front of a damper spring of the device has a limited structure, the driving performance at a low RPM is degraded.

The information disclosed in this Background section is only for enhancement of understanding of the background of the invention and should not be taken as an acknowledgement or any form of suggestion that this information forms the prior art that is already known to a person skilled in the art.

SUMMARY OF THE INVENTION

Accordingly, the present invention has been made in an effort to solve the above-described drawbacks and an object of the present invention is to provide a power transmission device for a hybrid vehicle, in which a torsion damper is disposed between an automatic transmission and a motor so that a flywheel, a motor rotor, an engine clutch and a retainer have the same inertia, thus providing a high damping force against engine fluctuation at low RPM operation by an engine and having an effective layout in terms of driving performance at low RPM by the engine and in terms of NVH (noise, vibration and harshness).

In one aspect, the present invention provides a power transmission device for a hybrid vehicle, in which an automatic transmission having an input shaft, a motor, an engine clutch, a flywheel, and an engine having an output shaft connected to a crank shaft of the engine are directly connected to the same axis, the power transmission device comprising: a motor support shaft, the outer end of which is supported by a motor rotor and the inner end of which extends toward the boundary between the output shaft of the engine and the input shaft of the automatic transmission; a motor housing arranged so as to surround the outer circumference and the left side surface of the motor rotor; a torsion damper disposed between the left side end of the motor housing and the motor rotor; an engine clutch, disposed between the left side end of the motor housing and the left side surface of the inner end of the motor support shaft, for power transmission between the output shaft of the engine and the input shaft of the automatic transmission; a retainer connecting a housing of the engine clutch to the torsion damper; a motor cover housing arranged to cover the right side surface of the motor rotor and the right side surface of the inner end of the motor support shaft and including a concave portion on the right side surface thereof; and a flywheel positioned at the concave portion of the motor cover housing to be blocked from the motor rotor.

In a preferred embodiment, a support bearing for supporting the rotation of the motor support shaft is mounted between the inner end of the motor support shaft and the inner end of the motor cover housing.

Preferably, a motor position sensor is mounted on the left side surface of the inner end of the motor cover housing, while being adjacent to the right side surface of the motor support shaft.

Suitably, the inner end of the motor support shaft is formed integrally at the center position of the outer end of the motor support shaft engaged with the motor rotor.

More suitably, the flywheel overlaps the outer circumference of the crank shaft and is placed at the concave portion of the motor cover housing.

It is understood that the term "vehicle", "vehicular" and other similar terms used herein are inclusive of motor vehicles in general, such as passenger automobiles including sports utility vehicles (SUV), buses, trucks, various commercial vehicles, watercraft including a variety of boats and ships, aircraft, and the like. The present devices will be particularly useful with a wide variety of motor vehicles.

Figure 1:
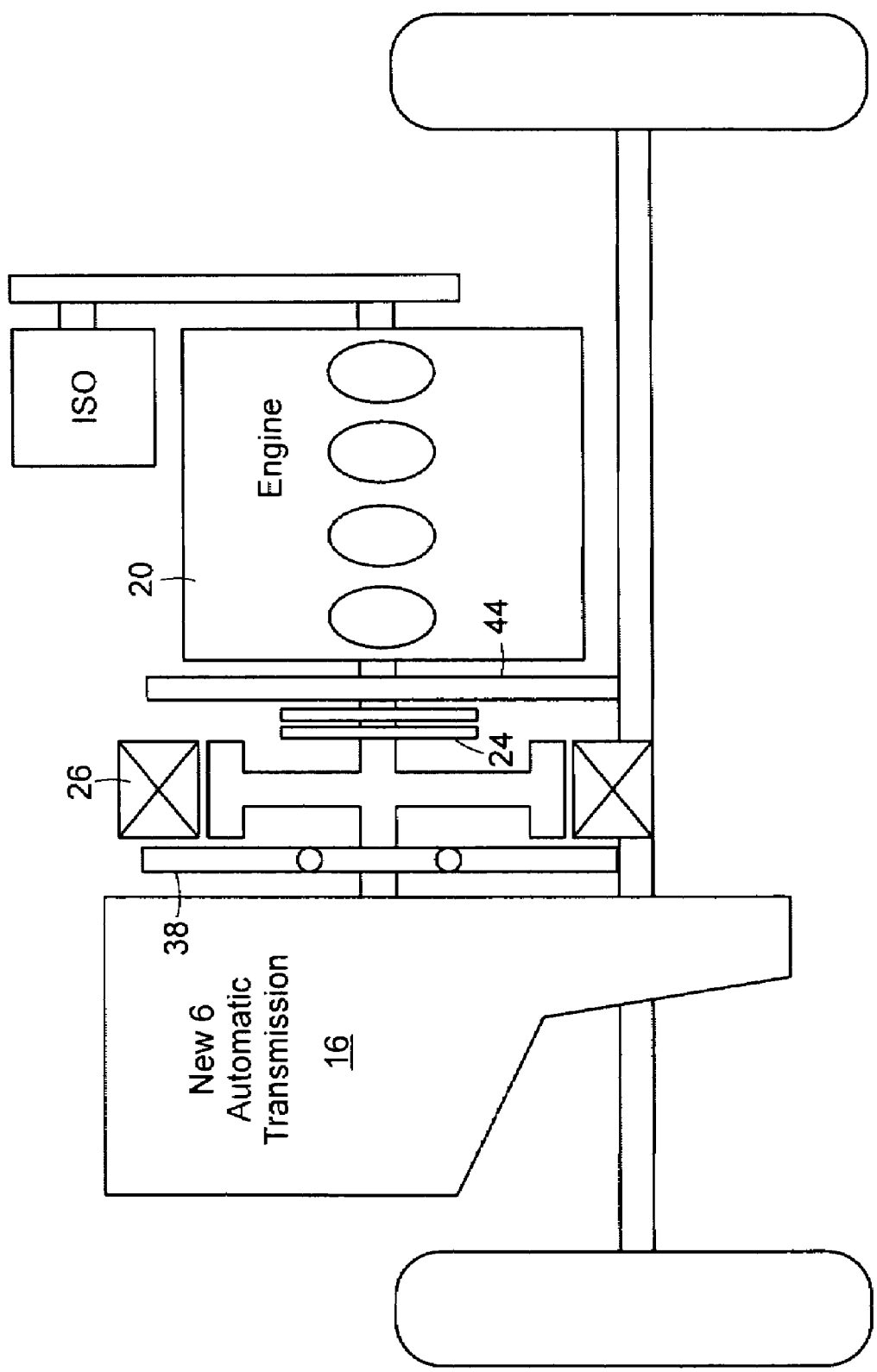
FIG. 1 is a schematic diagram illustrating the power transmission of a power transmission device for a hybrid vehicle in accordance with the present invention.

Reference numerals set forth in the Drawings includes reference to the following elements as further discussed below:

| 10: motor rotor | 12: motor support shaft |
|---|---|
| 14: engine output shaft | 16: automatic transmission |
| 18: input shaft | 20: engine |
| 22: motor housing | 24: engine clutch |
| 26: motor | 28: motor cover housing |
| 30: support bearing | 32: motor position sensor |
| 36: concave portion | 38: torsion damper |
| 40: crank shaft | 42: retainer |
| 44: flywheel | |

DETAILED DESCRIPTION

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

Figure 2:
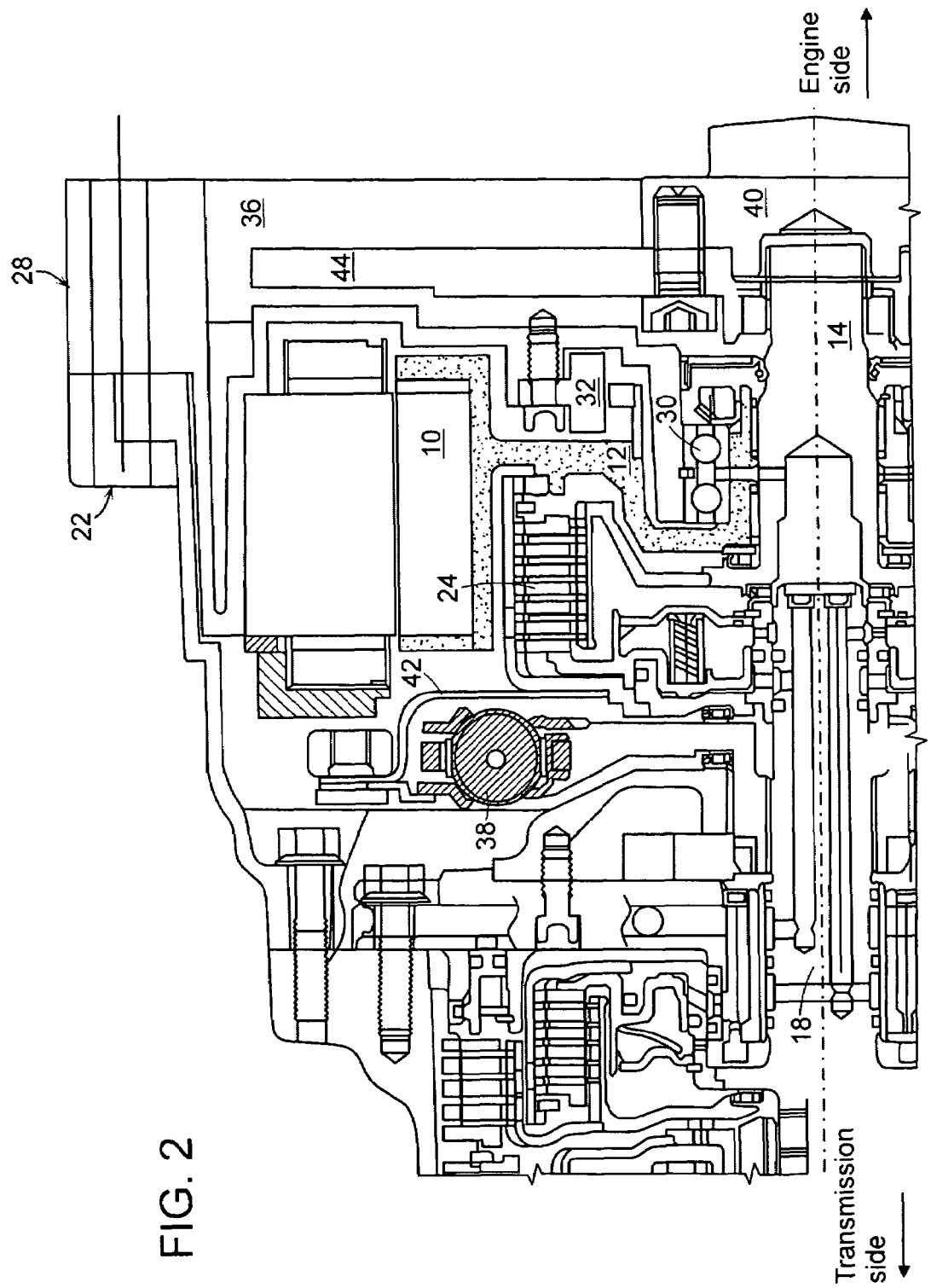
FIG. 2 is a schematic cross-sectional view illustrating the structure of a power transmission device for a hybrid vehicle in accordance with the present invention.

FIG. 1 is a schematic diagram illustrating the power transmission of a power transmission device for a hybrid vehicle in accordance with the present invention, and FIG. 2 is a schematic cross-sectional view illustrating the structure of a power transmission device for a hybrid vehicle in accordance with the present invention.

A power transmission device for a hybrid vehicle in accordance with the present invention has a layout in which an automatic transmission 16 having an input shaft 18, a motor 26 and an engine 20 are directly connected to the same axis, a torsion damper 38 is disposed between the automatic transmission 16 and the motor 26, a flywheel 44 is disposed between the motor 26 and the engine 20, and an engine clutch 24 is disposed between the motor 26 and the torsion damper 38.

That is, the present invention provides a layout in which the flywheel 44, a motor rotor 10, the engine clutch 24 and a retainer 42 of the torsion damper 38 have the same inertia, thus providing a high damping force against engine fluctuation at low RPM operation by the engine 20.

First, the layout of a motor assembly directly connected between the engine 20 and the automatic transmission 16 will be described below.

The motor rotor 10 in the motor assembly is supported by a motor support shaft 12. An outer end of the motor support shaft 12 is supported by the motor rotor 10 and an inner end thereof extends toward the boundary between the engine output shaft 14 connected to the engine 20 and the input shaft 18 of the automatic transmission 16.

Here, the inner end of the motor support shaft 12 is formed integrally at the center position of the outer end of the motor support shaft 12 so as to have evenly distributed supporting strength and avoid undesired rotational momentum. In addition, as illustrated in FIG. 2, the inner end of the motor support shaft 12 has a sectional shape of "U".

Meanwhile, the motor assembly includes a motor housing 22 arranged to surround the outer circumference and the left side surface of the motor rotor 10, the left side surface of the engine clutch 24, and the left side surface of the torsion damper 38 at a predetermined distance.

More particularly, the engine clutch 24 for power transmission between the engine output shaft 14 and the input shaft 18 of the automatic transmission 16 is disposed in a space between the inside of the outer end and the left side surface of the inner end of the motor support shaft 12 supporting the motor rotor 10.

Especially, the torsion damper 38 is disposed in a space between the left side end of the motor housing 22 and the left side surface of the engine clutch 24 and the motor rotor 10.

Accordingly, the motor rotor 10, the engine clutch 24, the motor support shaft 12 supporting the motor rotor 10, and the torsion damper 38 are disposed in a space, i.e., inside the motor housing 22.

In this case, a housing of the engine clutch 24 and the torsion damper 38 are connected to each other by the retainer 42.

As a result, the engine clutch 24 and the torsion damper 38 are disposed between the motor 26 and the automatic transmission 16 and a portion of the engine clutch 24 is arranged to overlap the inside of the motor 26, i.e., the inner circumference of the motor rotor 10, thus improving the space utilization of the power transmission device for a hybrid vehicle and changing the inertia.

Meanwhile, the motor assembly includes a motor cover housing 28 arranged to cover the right side surface of the motor rotor 10 and the right side surface of the inner end of the motor support shaft 12 at a predetermined distance.

In this case, a support bearing 30 for supporting the rotation of the motor support shaft 12 is mounted between the inner end of the motor support shaft 12 and the inner end of the motor cover housing 28.

Moreover, a motor position sensor 32 is mounted on the left side surface of the inner end of the motor cover housing 28, while being adjacent to the right side surface of the motor support shaft 12. The motor position sensor 32 detects the position and the rotational speed of the motor rotor 10.

Meanwhile, a concave portion 36 having a concave space is formed on the right side surface of the motor cover housing 28, and the flywheel 44 is placed in the concave portion 36 of the motor cover housing 28. The flywheel 44 overlapping the outer circumference of a crank shaft 40 is placed in the concave portion 36 of the motor cover housing 28.

Accordingly, the motor rotor 10 and the flywheel 44 38 are blocked (isolated) from each other by the motor cover housing 28. The motor cover housing 28 prevents transmission oil from flowing to the flywheel 44, and in turn reduces the amount of oil loss and prevents the drive loss of the torsion damper that may have otherwise caused by the transmission oil.

As described above, the present invention provides the following advantageous effects.

With the layout of the power transmission device in accordance with the present invention, in which the torsion damper is disposed between the automatic transmission and connected to the engine clutch by the retainer, the flywheel, the motor rotor, the engine clutch and the retainer of the torsion damper have the same inertia, it is possible to provide a high damping force against engine fluctuation at low RPM operation by the engine.

Moreover, the present invention provides a layout of the power transmission device having an effective layout in terms of driving performance at low RPM operation by the engine and in terms of NVH (noise, vibration and harshness).

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A power transmission device for a hybrid vehicle, in which an automatic transmission having an input shaft, a motor, an engine clutch, a flywheel, and an engine having an output shaft connected to a crank shaft of the engine are directly connected to the same axis, the power transmission device comprising:
   a motor support shaft, the outer end of which is supported by a motor rotor and the inner end of which extends toward the boundary between the output shaft of the engine and the input shaft of the automatic transmission;
   a motor housing arranged to surround the outer circumference and the left side surface of the motor rotor;
   a torsion damper disposed between the left side end of the motor housing and the motor rotor;
   an engine clutch disposed between the left side end of the motor housing and the left side surface of the inner end of the motor support shaft for providing power transmission between the output shaft of the engine and the input shaft of the automatic transmission;
   a retainer connecting a housing of the engine clutch to the torsion damper;
   a motor cover housing arranged so as to cover the right side surface of the motor rotor and the right side surface of the inner end of the motor support shaft and including a concave portion on the right side surface thereof; and
   a flywheel positioned at the concave portion of the motor cover housing to be blocked from the motor rotor.

2. The power transmission device of claim 1, wherein a support bearing for supporting the rotation of the motor support shaft is mounted between the inner end of the motor support shaft and the inner end of the motor cover housing.

3. The power transmission device of claim 1, wherein a motor position sensor is mounted on the left side surface of the inner end of the motor cover housing, while being adjacent to the right side surface of the motor support shaft.

4. The power transmission device of claim 1, wherein the inner end of the motor support shaft is formed integrally at the center position of the outer end of the motor support shaft engaged with the motor rotor.

5. The power transmission device of claim 1, wherein the flywheel overlaps the outer circumference of the crank shaft and is placed at the concave portion of the motor cover housing.

* * * * *